Aug. 25, 1964    B. F. TOFFLEMIRE    3,145,472
PRE-CONTOURED DENTAL MATRIX BAND
Filed June 4, 1962
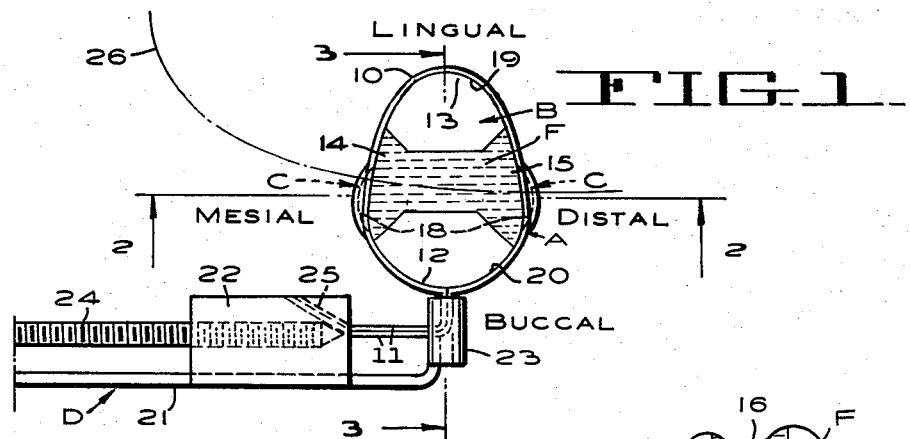
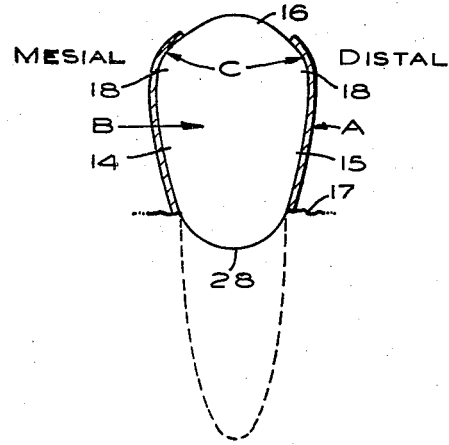
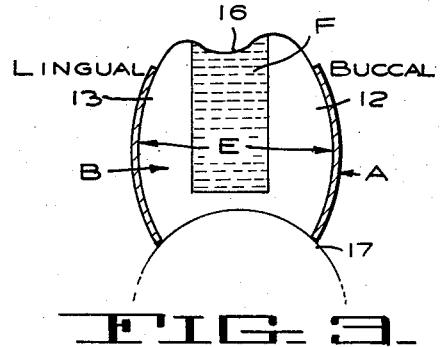
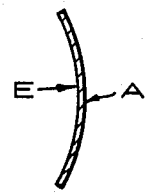
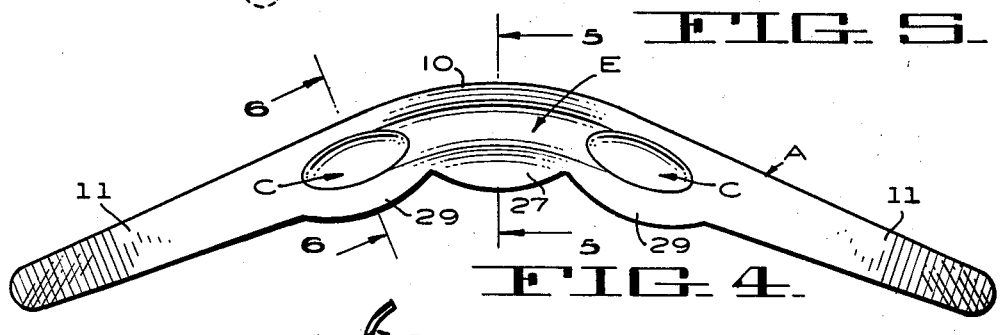
INVENTOR.
BENJAMIN F. TOFFLEMIRE
BY Joseph F. Cole
ATTORNEY

3,145,472
PRE-CONTOURED DENTAL MATRIX BAND
Benjamin F. Tofflemire, P.O. Box 677, Lafayette, Calif.
Filed June 4, 1962, Ser. No. 199,769
7 Claims. (Cl. 32—63)

The present invention relates to improvements in a pre-contoured dental matrix band. It has particular reference to improvements over my United States Letters Patent on "Anatomical Contact-Forming Dental Matrix Band," Patent No. 2,591,744, dated April 8, 1952.

An object of this invention is to provide a dental matrix band which is adapted to be looped around and constricted against a patient's tooth, the band being fashioned with preformed spaced concavities in its tooth-embracing or inner surface, these concavities being disposed to encompass normal mesial and distal interproximal contact areas between the banded tooth and adjacent teeth, regardless of whether the band is applied from the lingual or buccal aspect of the banded tooth.

Moreover, the preformed concavities are elongated so that the band may be applied to bicuspids or molars having different lingual and buccal arcs, and yet the band may embrace the surface morphology of the patient's tooth.

Another object of the invention is to provide a preformed isthmus groove in the tooth-embracing or inner surface of the dental band that extends between the preformed concavities, this groove being preshaped in an occluso-gingival cross-section to substantially conform to the lingual and buccal surfaces of the banded tooth.

Other objects and advantages will appear as the specification proceeds. The novel features of the invention will be pointed out in the appended claims.

*Drawing*

For a better understanding of the invention, reference should be had to the accompanying drawing, forming part of this specification, in which:

FIGURE 1 is an occlusal view of a bicuspid in the lower right quadrant, showing my dental band applied around this tooth from the buccal aspect;

FIGURE 2 is a mesial-distal sectional view taken along the line 2—2 of FIGURE 1, and looking at the buccal aspect of the banded tooth;

FIGURE 3 is a bucco-lingual view taken along the line 3—3 of FIGURE 1;

FIGURE 4 is an enlarged face view of my dental matrix band, looking at the tooth-embracing or inner surface thereof; and FIGURES 5 and 6 are enlarged sectional views taken along lines 5—5 and 6—6, respectively, of FIGURE 4 and disclosing the isthmus groove and a preformed concavity, respectively.

While I have shown only the preferred form of my invention, it should be understood that various changes, or modifications, may be made within the scope of the annexed claims without departing from the spirit thereof.

*Detailed Description*

Referring now to the drawing in detail, I have shown a dental matrix band that is indicated generally at A. This band is formed from a strip of pliable material having an arcuate central portion 10 and arms 11 extending from the arcuate central portion, with the arms diverging relative to one another when the strip is flat, as in FIGURE 4.

The strip of the band A has an inner surface disposed to embrace the surface morphology of a patient's tooth B, when the strip is looped and constricted around the tooth, as illustrated in FIGURE 1.

In order that the terms hereinafter used may be clearly understood, the anatomical parts of the tooth B are indicated by reference numerals as follows: 12—buccal surface (toward cheek); 13—lingual surface (tongue side); 14—mesial surface (toward median plane of the body); 15—distal surface (remote or away from the median plane); 16—occlusal surface; 17—gingival (gum) border; 18—normal mesial and distal interproximal contact areas between the banded tooth B and adjacent teeth.

It will be noted from FIGURES 2, 4 and 6 that the matrix band strip A has a pair of preformed elongated concavities C in its tooth-embracing or inner surface which are spaced apart so as to encompass the interproximal contact areas 18, with one of the concavities registering with the mesial contact area and the other concavity encompassing the distal contact area of the same tooth. This will occur when the arcuate central portion 10 is applied against either the lingual arc 19 or the buccal arc 20 of a bicuspid or molar and the looped strip is constricted around the selected posterior tooth.

As illustrated in FIGURES 2 and 6, each concavity C is curved in an occluso-gingival cross-section so that the deepest part of the concavity is situated in the occlusal third area of the strip to thus conform to the surface morphology of the tooth. Particular attention is called to the fact that each concavity C tapers abruptly in an occlusal direction, and tapers gradually in a gingival direction on substantially an inclined plane.

Moreover, each concavity C is substantially oval in face view (see FIGURE 4), with the major axis of the oval extending generally lengthwise of the strip A. This arrangement will permit the concavities to be accommodated to the mesial and distal interproximal contact areas 18 of teeth in which the lingual arcs 19 and buccal arcs 20 differ from one another and these arcs vary from one tooth to another.

The arcuate central portion 10 is wider in an occluso-gingival direction than the arms 11, and the latter taper towards their outer ends for attachment to a matrix retainer D (see FIGURE 1).

As an important structural feature, the strip A has a preformed isthmus groove E fashioned in its tooth-embracing or inner surface that extends between the preformed concavities C and along the arcuate central portion 10 of the strip. This isthmus groove is preshaped in an occluso-gingival cross-section to substantially conform to the lingual and buccal surfaces 13 and 12, respectively, of the banded tooth B (see FIGURES 3 and 5). This occluso-gingival cross-section of the isthmus groove E is substantially on an arc of a circle.

For the purpose of constricting the dental matrix band A around a patient's tooth, I have illustrated a fragmentary portion of the matrix retainer in FIGURE 1, this retainer being more fully illustrated in my United States Patent No. 2,502,903, dated April 4, 1950.

Briefly described, the retainer D has a bar-like frame 21 on which a clamping block 22 is slidably mounted. This frame has a slotted head 23 through which overlapped end sections 11 or the arms of the matrix strip are guided. The outer ends of the arms 11 are clamped to the block by a threaded spindle 24, the ends of these arms being inserted into a diagonal slot 25 of the clamping block. When the block 22 is retracted away from the slotted head 23, the matrix band A will be drawn into firm embracing relation around the banded tooth B.

The matrix band retaining clamps shown in my copending application, Serial No. 93,435, filed March 6, 1961, (now Patent No. 3,045,659, dated July 31, 1962) may be inserted between the slotted head 23 and the looped portion of the matrix band A so as to straddle the overlapped arms 11, if desired.

It will be noted that the preformed concavities C and the connecting isthmus groove E extend around approximately seventy-five percent of the coronal portion of the tooth B. The tooth-embracing or inner surface of the band is contoured to the surface morphology of the banded tooth. The same band A may be used on bicuspids or molars and applied from the buccal or lingual aspect.

The curvature of the quadrant in which the tooth B is disposed is indicated by the curved centerline 26 in FIGURE 1 of the drawing.

In FIGURES 1 and 3, I have shown a prepared cavity in the tooth B as having been packed with a filling F. The preformed concavities C in the matrix band A are positioned and open toward the filling F to receive extended portions of the latter, when the filling is packed in the prepared cavity. These extended portions of the filling project toward the adjacent teeth to reform the eminences at the normal mesial and distal contact areas 18 of the banded tooth in its interproximal regions.

Referring to FIGURE 4, I have shown a gingival bulge 27 on the central arcuate portion 10 of the band strip A, which is disposed to follow the gingival curvature 28 of the tooth B on either the buccal aspect 12 or the lingual aspect 13 (see FIGURE 2). Also, the band strip A is provided with sub-gingival extensions 29 that are disposed gingivally of the preformed concavities C in positions to cover very deep sub-gingival step-preparations in the interproximal areas of the banded tooth.

While it is desirable to provide the band strip A with the central gingival bulge 27, I wish to point out the fact that one or both of the sub-gingival extensions 29 may be omitted. Since this is apparent, no illustration is considered necessary.

I claim:

1. In a pre-contoured dental matrix band:
   (a) a strip of pliable material having an arcuate central portion and arms extending from the arcuate central portion, with the arms diverging relative to one another when the strip is flat;
   (b) the strip having an inner surface;
   (c) the strip having a pair of preformed elongated concavities in its inner surface which are spaced apart;
   (d) each of the preformed concavities being substantially oval in face view, with the major axis of the oval extending generally lengthwise of the strip.

2. In a pre-contoured dental matrix band:
   (a) a strip of pliable material having an arcuate central portion and arms extending from the arcuate central portion, with the arms diverging relative to one another when the strip is flat;
   (b) the strip having an inner surface;
   (c) the strip having a pair of preformed elongated concavities in its inner surface which are spaced apart;
   (d) the strip having a preformed isthmus groove fashioned in its inner surface that extends between the preformed concavities and along the arcuate central portion of the strip.

3. The pre-contoured dental matrix band, as set forth in claim 2;
   (e) and in which the transverse cross-section of the isthmus groove defines an arc of a circle.

4. In a pre-contoured dental matrix band:
   (a) a strip of pliable material having an arcuate central portion and arms extending from the arcuate central portion, with the arms diverging relative to one another when the strip is flat;
   (b) the strip having an inner surface;
   (c) the strip having a pair of preformed elongated concavities in its inner surface;
   (d) each preformed concavity being curved in transverse cross-section so that the deepest part of concavity is situated toward one edge of the strip;
   (e) each concavity tapering abruptly toward one edge of the strip, and tapering gradually toward an opposite edge of the strip on substantially an inclined plane;
   (f) the strip having a preformed isthmus groove fashioned in its inner surface that extends between the preformed concavities and along the arcuate central portion of the strip.

5. The pre-contoured dental matrix band, as set forth in claim 4;
   (g) and in which an edge bulge is provided on the central arcuate portion of the strip.

6. The pre-contoured dental matrix band, as set forth in claim 4;
   (g) and in which the strip is provided with edge extensions that are disposed adjacent to the preformed concavities.

7. In a pre-contoured dental matrix band:
   (a) a strip of pliable material having an inner surface;
   (b) the strip defining free and unobstructed opposite end portions;
   (c) the strip having a central portion provided with an isthmus groove which is pre-contoured and concaved in transverse cross-section in its inner surface;
   (d) the strip further having spaced pre-contoured concaved portions in its inner surface;
   (e) each of the spaced precontoured concaved portions being curved in transverse cross-section so that the deepest part thereof is situated toward one edge of the strip, and each tapering abruptly toward one edge of the strip and tapering gradually toward an opposite edge of the strip;
   (f) and the isthmus groove extending the entire distance between and merging into the spaced pre-contoured concave portions.

References Cited in the file of this patent

UNITED STATES PATENTS

| | | |
|---|---|---|
| 2,591,744 | Tofflemire | Apr. 8, 1952 |
| 2,594,367 | Tofflemire | Apr. 29, 1952 |
| 2,611,182 | Tofflemire | Sept. 23, 1952 |
| 2,790,238 | Trangmar | Apr. 30, 1957 |
| 2,891,313 | Crowley | June 23, 1959 |
| 2,918,724 | Thurman | Dec. 29, 1959 |